June 7, 1955  N. C. CLARK  2,710,367
MEANS FOR THE PROTECTION OF AIRCRAFT GENERATORS
Filed Jan. 23, 1951
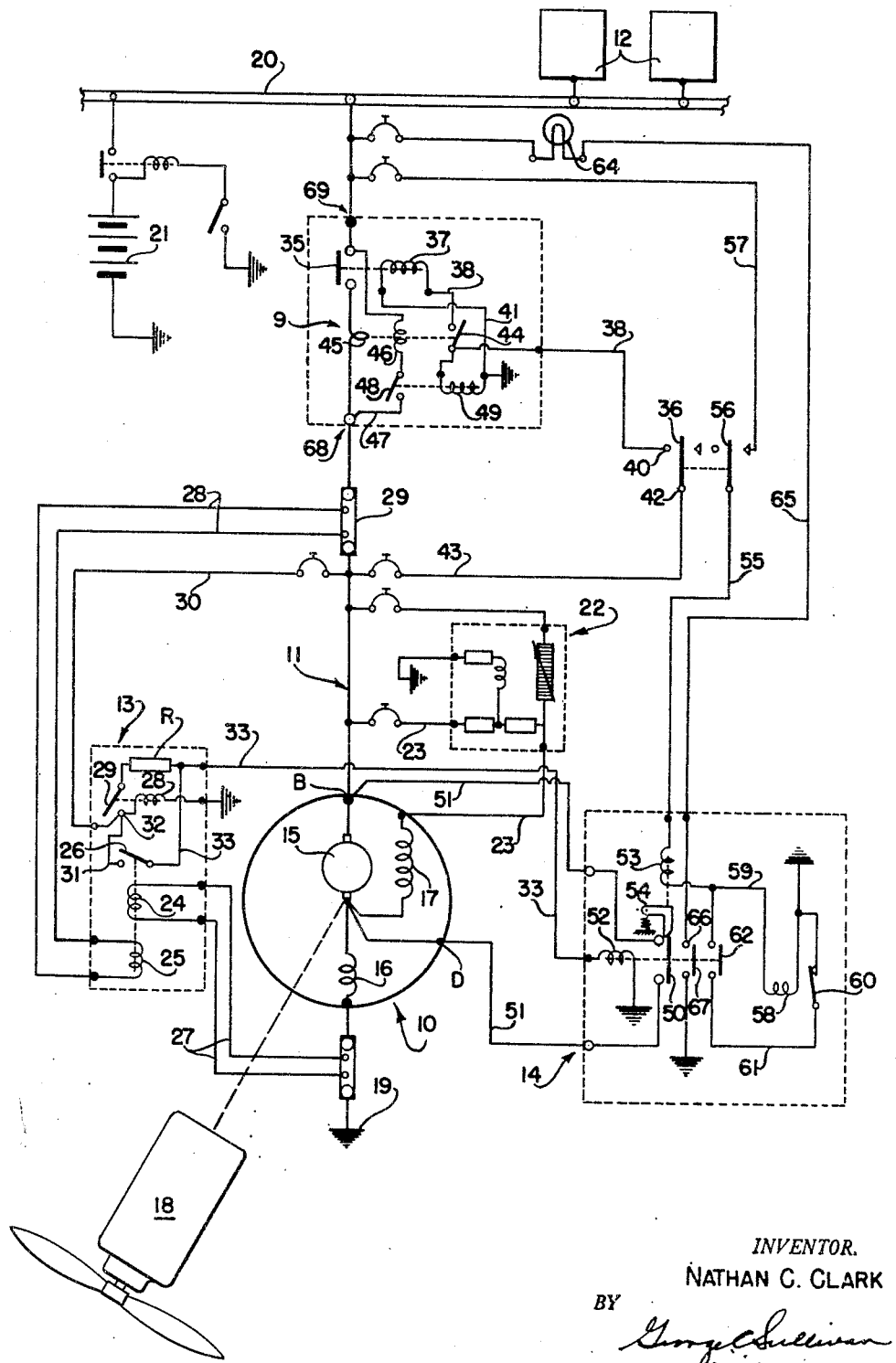
INVENTOR.
NATHAN C. CLARK
BY
George C. Sullivan
Agent United States Patent Office 2,710,367
Patented June 7, 1955

2,710,367

MEANS FOR THE PROTECTION OF AIRCRAFT GENERATORS

Nathan C. Clark, Los Angeles, Calif., assignor to Lockheed Aircraft Corporation, Burbank, Calif.

Application January 23, 1951, Serial No. 207,252

2 Claims. (Cl. 317—13)

This invention relates to generator systems such as employed in aircraft, and relates more particularly to circuits for the protection of self-excited D. C. generators and their associated devices.

In present day aircraft the generator or generators are driven by the propulsive engines to supply the electrical energy to the various electrically energized auxiliaries and devices of the airplane. The generators, being driven in this manner, remain in operation even though serious and potentially hazardous short circuits and the like develop in the electrical system. While various protective devices for the generator circuits have been introduced and are employed extensively, there is, to my knowledge, no presently available means for deenergizing the self-excited D. C. generators of aircraft, or at least reducing their output to extremely low and non-hazardous values, in the event that short circuits or certain other faults develop in the generator feeder circuits, etc.

It is, therefore, a general object of the present invention to provide practical, effective and dependable means for deenergizing an aircraft generator in the event that short circuits, over-voltage conditions, and the like, develop that may result in destruction of the equipment and/or fires if the generator continues to operate after the occurrence of such faults or conditions. In most aircraft the generator or generators continue to rotate after they are electrically disconnected from their buses, because the engines which drive the generators must normally be kept in operation. Present day protective systems serve to electrically disconnect the generator from the rest of the airplane's electrical system under certain fault conditions. Such electrical disconnection of the generator, while it continues to be driven, does not prevent the generation of high voltage, the flow of excessive current in the shunt field, or the imposition of severe operating duties on the contactors that have served to disconnect the generators. Thus the continued rotation of the generator armature after the disconnection of a generator from the feeder or bus, may result in burning out of the generator, the creation of smoke and flame, and irreparable damage to the equipment or to the airplane. The protective system or means of the invention completely avoids these hazards by rendering the generator incapable of producing any appreciable current even though it continues to rotate at normal speeds throughout the duration of the faulty condition.

Another object of the invention is to provide an aircraft generator protective system that serves to short circuit or provide a shunt across the armature of the generator, thus reducing the voltage at the armature terminals and the current in the field windings to such low values that the magnetomotive force of the field windings is negligible and continued operation or rotation of the generator can cause no damage to the generator or other equipment. By automatically shunting out the armature of the generator the system of the invention positively prevents the existence of over voltage and sustained feeder fault currents.

A further object of the invention is to provide a protective system of the character mentioned that is automatically tripped or operated upon the development of a feeder fault (that is a short circuit to ground in the generator feed line), over-voltage, or other faults or malfunctioning. In accordance with the invention the armature shunting circuit may be made to operate to protect its respective generator by the action of feeder fault sensing devices, over-voltage sensing devices, or other devices or circuits associated with the generator and/or its feeder circuit.

A further object of the invention is to provide a protective system or circuit of this class that is relatively inexpensive and that may be readily incorporated in single or multiple generator systems with a minimum of additional weight.

Other objectives and features of the invention will become apparent from the following detailed description of typical preferred embodiments throughout which reference is made to the accompanying drawing wherein the figure is a wiring diagram of a typical generator circuit and a protective system therefor embodying the present invention.

In the drawing, I have illustrated the invention embodied in a simple single generator circuit such as may be employed in small private airplanes, and the like. This circuit may be said to comprise, generally, the generator 10, a feeder 11 from the generator to the loads 12, a fault and over-voltage sensing device 13, a reverse current and differential relay device 9, and a shunting or short-circuiting device 14 for the armature of the generator.

The generator 10 is of the self-excited type and includes an armature 15 and a shunt field 17 and may also include series windings 16. The present invention is not primarily concerned with the particular make or details of the generator employed except that the generator shall be self-excited by a shunt field winding. I have shown the generator 10 driven by a propulsive engine 18 in accordance with conventional aircraft practice, the driving connection being such that the generator armature 15 is driven or rotated so long as the engine is in operation. The field 16 is connected to ground at 19 while the generator output line or feeder 11 extends to a bus 20 with which the various loads 12 are connected. I have also shown a battery 21 connected between ground and the bus 20, as is conventional practice in aircraft installations of this kind. There is shown a voltage regulator 22 with leads 23 to the feeder 11 and the shunt windings 17 of the generator. While a voltage regulator is required in an aircraft generator circuit the present invention is not concerned with the regulator except insofar as it may be considered to constitute a part of this form of circuit.

The fault and over-voltage sensing device 13 is connected in the generator circuit to respond to a fault in the feeder 11 and to over-voltage conditions. The device 13 may include a pair of normally balanced windings or coils 24 and 25 for operating a contactor 26. Leads 27 connect the terminals of the winding 24 with the ground lead 19 from the series windings 16 of the generator 10. In a like manner leads 28 extend from a shunt 29 in the feeder 11 to the terminals of the coil 25. During normal operation the coils 24 and 25 produce opposing and cancelling magnetic fields and the contactor 26 remains in the open position. In the event of a feeder fault, that is a short-circuit to ground, the magnetic balance of the coils 24 and 25 is disturbed or destroyed and the contactor 26 is closed. Thus the coils 24 and 25 and the contactor 26 constitute a unit or means responsive to feeder faults.

The device 13 also senses over-voltage, that is voltage in the generator circuit in excess of a given or chosen value. A coil 28 is provided in the device 13 to operate a contactor 29 and is supplied with current by a line 30 extended from the feeder 11 to one terminal of the coil. The other terminal of the coil 28 is grounded. The coil 28 is such that its contactor 29 remains open until an over-voltage condition slightly greater, say from 5 to 20% greater, than the normal operating voltage of the system exists, whereupon the coil carries sufficient current to close the contactor 29. Thus the coil 28 and the contactor 29 constitute an over-voltage sensing means. This over-voltage sensing means and the above described fault or short circuit sensing means may, if desired, be separate and independent devices housed in separate housings. However, in practice these two means may be incorporated in a single device and may be housed in one housing. I have shown a bridge 31 connecting the stationary poles or contacts of the contactors 26 and 29, the contact 32 for the contactor 29 being in the above described energized line 30 from the feeder 11. The movable contactors 26 and 29 are connected with a wire or lead 33 which extends to the armature shunting means or device 14 to be hereinafter described.

The above mentioned means 9 has associated therewith the main contactor 35 of the generator feeder 11 and the generator switch 36. The main contactor 35, which is interposed directly in the feeder 11, is operated by a coil 37. The generator switch 36, which may be manually operated, has a lead 38 extending from one of its stationary contacts 40 to one contact of the relay 44, and from the other contact of this relay 44 a wire connects to the main coil 37 of the main contactor 35, the other terminal of the main contactor coil being grounded by line 41. One terminal of coil 49 of the polarized potential relay 48 is also connected to wire 38, and the other end of this coil is grounded. The companion contact 42 of the switch 36 is connected with the generator feeder 11 by line 43. Thus upon closing switch 36 the coil 49 is energized in whichever polarity corresponds to the polarity of the generator 10. The armature of this relay 48 is made of a permanent-magnet material, and thus is pulled by the coil 49 only if the polarity of the generator is correct, normally positive. If the generator 10 has built-up with reversed or negative voltage or polarity, as occurs sometimes by accident, this relay armature is not moved and further action of the system is prevented. If the generator polarity is correct, the contact 48 of the polarized potential relay closes, permitting current to flow through wire 47 and coil 46. The armature of this relay 46 is also of permanent-magnet material and is pulled in a direction to close contact 44 only when the potential of terminal 68 is more positive than that of terminal 69 by a predetermined amount, normally a fraction of one volt. By the combined action of these two latter relays 48 and 44, having coils 49 and 46, contact 44 is closed only if the generator 10 is of the desired polarity and also producing a voltage slightly higher than that of the bus 20. When contact 44 closes, as described above, coil 37 of the main contactor 35 is energized by current flowing from the feeder 11 through the generator switch 36 and through wire 38 and contact 44. This causes the main contactor 35 to close, thus connecting the generator 10 to the bus 20. At this time coil 46 is short circuited and deenergized and no longer carries any current. If, at any time, a reverse or negative current flows through the main contactor 35, in the direction from the bus 20 to the feeder 11, the magnetomotive force produced by this current passing through coil 45 forces the contact 44 to open, thus deenergizing coil 37 and allowing the main contactor 35 to open. In this way the generator 10 is disconnected from the bus 20 whenever the generator accepts current and energy from the bus.

The short circuiting device 14 which is a feature of the invention, serves to shunt out or short circuit the armature 15 of the generator 10 upon being "tripped" or actuated by either the over-voltage sensing or the fault sensing means of the above described device 13. The armature shunting device includes a main contactor 50 interposed in a line 51 which has its ends or terminals connected with the generator 10 at points B and D so as to short circuit the armature 15 when the contactor is in the closed position. The contactor 50 is operated by a trip coil 52 having one terminal connected with the above described lead 33 and having its other terminal grounded. It will be seen that upon closing of either the contact 26 or the contact 29 of the device 13 a circuit is completed from the feeder 11 through the line 30 and lead 33 to the coil 52 to energize the coil 52 and close the contactor 50. Thus the armature short circuiting circuit 51 is closed upon the occurrence of either a feeder fault or an over-voltage condition in the feeder 11.

The device 14 further includes means for resetting the contactor 50 upon correction of the faulty condition and upon actuation of the generator switch 36 to the reset position. A resetting coil 53 actuates a spring loaded resetting lever 54 and the coil is energized by a lead 55 extending to a contact 56 of the generator switch. The contact 56 serves to connect the lead 55 with a lead 57 extending to the feeder 11. It will be seen that upon actuating the generator switch 36 to the reset position a circuit is completed through the resetting coil 53 to reset the contactor 50 to its open or normal position.

The armature shorting device 14 also includes an "anti-pump" relay for preventing the resetting circuit from "pumping" or cycling when the generator switch is held in the reset position following a feeder fault or over-voltage condition. The anti-pump relay includes a coil 58 having one terminal connected with the resetting coil 53 by a line 59, the coil 58 being arranged to operate a contact 60. The contact 60 is in a line 61 extending from the line 59 to the other terminal of the coil 58 which is also grounded. When the generator switch 56 is held in the "reset" position, current flows to the reset coil 53 as described in the previous paragraph, and from this coil 53 to ground by way of wires 59 and 61, and contacts 62 and 60 both of which are closed. Coil 58 carries practically no current because it is short circuited. As soon as the short circuit contactor 50 opens, after release by coil 53, contact 62 opens, forcing the current from coil 53 to pass through wire 59 and coil 58 of the anti-pump relay. The resistance of coil 58 is considerably higher than the resistance of coil 53, causing the current passing through the two relays to be much smaller than that which passed through coil 53 before contact 62 opened. This decreased current is enough to keep contact 60 open, but insufficient to hold the armature of the reset coil 53 in the reset position. If a feeder fault or over-voltage condition then occurs or continues on the generator system, the trip coil 52 will be operated as previously described, but the reset circuit will not cause opening of the short circuit contactor 50, thus cycling or pumping is prevented from occurring.

When the generator switch 56 is returned to the "off" position, as shown in the drawing, coil 58 is deenergized, contact 60 closes, and the armature shunting relay 50 and the reset coil 53 are ready to operate as previously described.

It will usually be preferred to associate an audible or visible signal or warning means with the device 14 to indicate that the armature 15 of the generator 10 is short circuited and that the generator is producing practically no current as a result of the operation of the means 14 due to a feeder fault or an over-voltage condition. I have shown a warning lamp 64 connected in a lead 65 extending from the feeder 11 to a contact 66. A contactor 67 associated with the contactor 50 to move therewith, serves to connect the contact 66 with ground to energize the lamp 64 when the contactor 50 closes to short circuit the generator armature 15. The lamp 64 remains lighted or energized only so long as the armature shorting contactor 50 remains in its closed or actuated position.

Having described only a typical form of the invention I do not wish to be limited to the specific details herein set forth, but wish to reserve to myself any variations or modifications that may appear to those skilled in the art and fall within the scope of the following claims.

I claim:

1. A protective system for a self-excited direct current generator having an armature and a feeder comprising in combination a zero impedance armature shunt having one end terminal connected with one side of said generator and the other end terminal connected to the other side of the generator, a relay operable to complete said shunt including a normally open contactor, means responsive to a malfunction in the feeder for energizing said relay, means for resetting said contactor to the open position after operation of the relay including an operating coil, a reset circuit for energizing the operating coil, an anti-cycling circuit for rendering said operating coil ineffective as long as the malfunction exists, including a parallel circuit connected in series with said operating coil, one branch of said parallel circuit having a high resistance coil, the other branch of said parallel circuit having a first contact operable by said high resistance coil, and a second contact in series with said first contact and operable by said contactor.

2. A protective system for a self-excited direct current generator having an armature and a feeder comprising in combination a zero impedence armature shunt having one end terminal connected with one side of said generator and the other end terminal connected to the other side of the generator, a relay operable to complete said shunt including a normally open contactor, an energizing circuit connected to said feeder for said relay for energizing the same, said energizing circuit having two branches, a normally open contact in one branch, means responsive to over voltage in the feeder for closing said contact to complete the circuit to said relay, a second normally open contact in the other branch, means responsive to a feeder to ground fault for closing said second contact to complete the circuit to said relay, means for resetting said contactor to the open position after operation of the relay including an operating coil, an anti-cycling circuit for rendering said operating coil ineffective as long as either the fault or over voltage conditions exist, including a parallel circuit connected in series with said operating coils, one branch of said parallel circuit having a high resistance coil, the other branch of said parallel circuit having a first contact operable by said high resistance coil, and a second contact in series with said first contact and operable by said contactor.

References Cited in the file of this patent

UNITED STATES PATENTS

| | | |
|---|---|---|
| 863,201 | Mossman | Aug. 13, 1907 |
| 1,298,442 | Bijur | Mar. 25, 1919 |
| 1,718,980 | Ringwald | July 2, 1929 |
| 1,729,871 | Graybill | Oct. 1, 1929 |
| 2,255,475 | Strauss | Sept. 9, 1941 |
| 2,494,365 | Sills | Jan. 10, 1950 |
| 2,534,895 | Austin et al. | Dec. 19, 1950 |
| 2,550,496 | Refschneider | Apr. 24, 1951 |

OTHER REFERENCES

"Short-Circuiting Techniques for Deactivating a Faulty Aircraft Generator," Electrical Engineering, August 1952, pp. 703–705.